(12) United States Patent
Zhen et al.

(10) Patent No.: US 8,036,259 B2
(45) Date of Patent: Oct. 11, 2011

(54) INTERACTIVE WIRELESS COMMUNICATION DEVICE

(75) Inventors: Bin Zhen, Tokyo (JP); Huan-Bang Li, Tokyo (JP); Yihong Qi, Tokyo (JP); Ryuji Kohno, Tokyo (JP)

(73) Assignee: National Institute of Information and Communications Technology, Tokyo (JP)

( * ) Notice: Subject to any disclaimer, the term of this patent is extended or adjusted under 35 U.S.C. 154(b) by 209 days.

(21) Appl. No.: 12/084,903

(22) PCT Filed: Nov. 13, 2006

(86) PCT No.: PCT/JP2006/322532
§ 371 (c)(1),
(2), (4) Date: Aug. 24, 2009

(87) PCT Pub. No.: WO2007/055350
PCT Pub. Date: May 18, 2007

(65) Prior Publication Data
US 2009/0323771 A1 Dec. 31, 2009

(30) Foreign Application Priority Data
Nov. 14, 2005 (JP) .................................. 2005-329440

(51) Int. Cl.
*H04B 1/40* (2006.01)
(52) U.S. Cl. ........ 375/219; 375/141; 375/150; 455/63.1
(58) Field of Classification Search .................. 375/141, 375/150, E1.002, 219; 455/63.1
See application file for complete search history.

(56) References Cited

U.S. PATENT DOCUMENTS
2004/0218581 A1* 11/2004 Cattaneo ....................... 370/350

2005/0265434 A1* 12/2005 Watanabe ....................... 375/150
2008/0212563 A1* 9/2008 Birru ............................. 370/350

FOREIGN PATENT DOCUMENTS
JP 2003 179576 6/2003
(Continued)

OTHER PUBLICATIONS

IEEE Standards 802.15.4-2003, IEEE Standard for InformationTechnology—Telecommunications and Information Exchange between Systems—Local and Metropolitan Area Networks-Specific Requirements; Part 15.4: Wireless Medium Access Control (MAC) and Physical Layer (PHY) Specifications for Low-Rate Wireless Personal Area Networks (LR-WPANs), pp. 1-669, Oct. 1, 2003.

(Continued)

*Primary Examiner* — Shuwang Liu
*Assistant Examiner* — David Huang
(74) *Attorney, Agent, or Firm* — Jacobson Holman PLLC

(57) ABSTRACT

A first communication apparatus sequentially generates a pulse sequence having pulse signals arranged based on the UWB communication system, performs a framing process to form a frame having at least a preamble and a data portion on the generated pulse sequence and inserts a preamble segment including a sequence of steady pulse signals in the data portion at a predetermined time interval, and transmits it as a radio wave. A second communication apparatus receives a pulse sequence as a radio wave transmitted from the first communication apparatus, and detects at least the preamble segment from the frame contained in the received pulse sequence through a detection window structured to have a predetermined time length, whereby a transmission timing for the pulse sequence to the first communication apparatus 2 controlled according to a state of detection of the preamble segment.

3 Claims, 10 Drawing Sheets

FOREIGN PATENT DOCUMENTS

JP    2005 277642    10/2005

OTHER PUBLICATIONS

Merz, R., et al., "A Joint PHY/MAC Architecture for Low-Radiated Power TH-UWB Wireless Ad-Hoc Networks", Wireless Communication and Mobile Computing Journal, pp. 567-580, 2005.

Win, M.Z., et al., "Ultra-wide bandwidth time-hopping Spread-Spectrum Impulse Radio for Wireless Multiple-Access Communications," IEEE Transactions on Communications, pp. 679-691, 2000.

Di Benedetto, M.G., "UWB-2: Uncoordinated, Wireless, Baseborn, Medium Access Control for UWB Communication Networks", Mobile Network and Applications, Special Issue on WLAN Optimization at the MAC and Network levels, 2004.

* cited by examiner

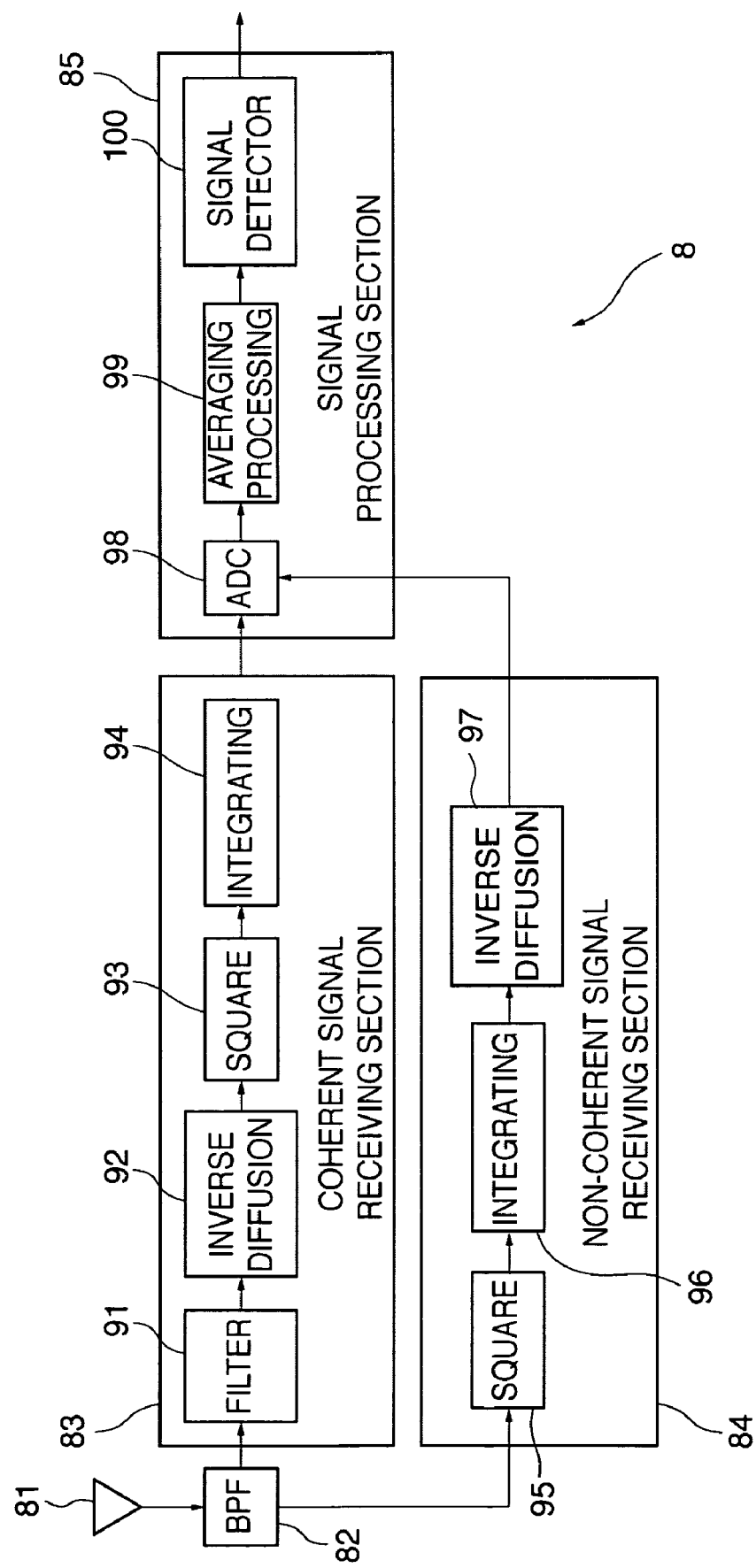

INTERACTIVE WIRELESS COMMUNICATION DEVICE

This is a national stage of PCT/JP2006/322532 filed on Nov. 13, 2006 and published in Japanese.

TECHNICAL FIELD

The present invention relates to a bidirectional wireless communication apparatus, and bidirectional wireless communication system and method, and, particularly, to a bidirectional wireless communication apparatus and bidirectional wireless communication system and method which are suitable at the time of carrying out bidirectional wireless communication based on a UWB (Ultra Wide Band) communication system.

BACKGROUND ART

Recently, UWB-based wireless communication which executes communication using pulse signals having a very narrow time width is being realized. In the UWB communication, pulse signals having a very narrow time width of 1 nanosecond to 2 nanoseconds are used, and the positions and phases of the pulse signals on the time axis are changed to transfer information. While the use of pulse signals having a very narrow time width of 1 nanosecond or less significantly widens the signal band where signals for UWB communication occupy to 500 MHz or greater, the modulation process itself becomes unnecessary, so that the spectral power density can be reduced. This achieves a high data transfer characteristic and high-precision distance measurement.

Therefore, a wireless communication system using the UWB can suppress the influence of noise low at the time of communication, and hence can eventually lead to cost reduction. In addition, the wireless communication system using the UWB can reduce the influences of various kinds of noise including a multipath.

However, the UWB-based wireless communication system has a difficulty in carrier sensing which is peculiar to the UWB communication. Accordingly, there is an increasing necessity of designing a system capable of detecting radio signals transmitted from a counterpart communication apparatus with a high reliability.

FIG. 1 shows an example of the format structure of packet data to be used in ordinary UWB-based wireless communication. The example of the format structure relates to a frame based on the standards of, for example, IEEE 802.11, IEEE 802.15.4 or the like. As shown in FIG. 1, frame data has an SFD (Start Frame Delimiter) 102 added to a preamble 101 for indicating the presence of the frame data, and a payload portion 103 added following the SFD 102. A gap of, for example, 12 bytes may be provided between frames.

Dummy information to prevent reception failure of frame data is written in the preamble 101. In the UWB-based wireless communication, in case of making the preamble 101, a plurality of regular codes of pulse signals having a very narrow time width are arranged, and after that a plurality of inverted sequences of the pulse signals are arranged.

The transmitted signal is acquired and evaluated by the preamble 101 first. When it is discriminated that a correct signal has been transmitted, communication is initiated in synchronism with the signal.

Because the preamble 101 has the pulse signals arranged regularly according to predetermined codes as mentioned above, a communication apparatus which has received the frame data added with the preamble 101 can capture signals, execute synchronization and channel prediction, and thus execute communication by detecting the regular sequence of pulse signals and codes thereof in the preamble 101. Other communication apparatuses excluding the counterpart communication apparatus which is currently in communication can easily determine whether the channel is occupied currently by acquiring information written in the preamble 101.

The SFD 102 has predetermined codes arranged therein and serves as a boundary between the preamble 101 and the payload portion 103.

The payload portion 103 is a real data portion generated by a user who performs communication using a communication apparatus. As shown in FIG. 2, while a signal which constitutes the payload portion 103 is partly added with a pulse sequence indicated by "S" in the diagram, an area where no real data is present is treated as an empty area. That is, the payload portion 103 is expressed by codes which are a combination of a pulse sequence indicated by "S" in the diagram and an empty area. The codes in FIG. 2 are merely an example, and there are various sequences of codes according to real data. That is, the payload portion 103 is structured to have a sequence of pulse signals and empty areas arranged irregularly.

Therefore, other communication apparatuses excluding the communication apparatus which is currently in communication can determine whether a channel is occupied by acquiring information written in the preamble 101 of frame data transmitted by the communication apparatus which is currently in communication. However, mere acquisition of information written in the payload portion 103 makes it difficult to discriminate whether a channel is occupied. When other communication apparatuses excluding the communication apparatus which is currently in communication determines that a channel is not occupied at a present time, the other communication apparatuses themselves may use the channel. Accordingly, a plurality of different communication apparatuses start communicating with one communication apparatus using the same channel, and interfere with one another.

That is, it is necessary to provide a situation where when data is transmitted from another communication apparatus to one communication apparatus, a further communication apparatus will not start data communication using the same channel.

Conventionally, as illustrated in Non-patent Document 1, for example, there has been proposed ALOHA which can ensure multiple access using dynamic codes to suppress inter-signal interferences. However, channel identification by the ALOHA has a problem that it is limited by the characteristics of devices installed in a communication apparatus, such as the processing performance, memory capacity and power supply.

There is a technique disclosed which time-sequentially controls reception of accesses from other communication apparatuses in order to prevent data transmission by different communication apparatuses at the same time (see, for example, Non-patent Documents 2 and 3). However, the technique has a difficulty in achieving synchronization.

Non-patent Document 1: R. Merz, J. Widmer, J. Y. Le Boudec, and B. Radunovic "A Joint PHY/MAC Architecture for Low-Radiated Power TH-UWB Wireless Ad-Hoc Networks", Wireless Communication and Mobile Computing Journal, Special issue on UWB communications. 5 (5): 567-580, 2005

Non-patent Document 2: Moe Z. Win and Robert A. Scholtz. "Ultra-wide bandwidth time-hopping spread-spectrum impulse radio for wireless multiple-access communications," IEEE Transactions on Communications, 48 (4): 679-691, 2000.

Non-patent Document 3: M.-G. Di Benedetto, L. De Nardis and M. Junk etc, "(UWB)~2: Uncoordinated, Wireless, Baseborn, medium access control for UWB communication networks," Mobile Network and Applications, special issue on WLAN optimization at the MAC and Network levels, 2004.

DISCLOSURE OF INVENTION

Problem to be Solved by the Invention

Accordingly, the present invention has been designed in view of the foregoing problems, and it is an object of the present invention to provide a bidirectional wireless communication apparatus, and bidirectional wireless communication system and method which can prevent a plurality of different communication apparatuses from performing data communications to one communication apparatus at the same time in a same channel or same piconet by detecting if a counterpart communication apparatus which attempts to transmit data is communicating with other communication apparatuses in the same channel or same piconet (in case of using the same code) at the time of carrying out bidirectional wireless communication based on the UWB communication system.

Means for Solving the Problem

To overcome the problem, a bidirectional wireless communication apparatus for carrying out bidirectional wireless communication based on a UWB (Ultra Wide Band) communication system according to the present invention is characterized by including pulse sequence generating means that sequentially generates a pulse sequence having pulse signals arranged based on the UWB communication system, framing means that performs a framing process to form a frame having at least a preamble and a data portion on the pulse sequence generated from the pulse sequence generating means and inserts a preamble segment comprised of a sequence of steady pulse signals in the data portion at a predetermined time interval, transmission means that transmits a pulse sequence containing the frame generated by the framing means as a radio wave, reception means that receives a pulse sequence as a radio wave transmitted from another bidirectional wireless communication apparatus, and detection means that detects at least the preamble segment from the frame contained in the pulse sequence received by the reception means through a detection window structured to have a predetermined time length, wherein a transmission timing of the transmission means for the pulse sequence is controlled according to a state of detection of the preamble segment by the detection means.

To overcome the problem, a bidirectional wireless communication system according to the present invention is characterized in that one of the communication apparatuses sequentially generates a pulse sequence having pulse signals arranged based on the UWB communication system, performs a framing process to form a frame having at least a preamble and a data portion on the generated pulse sequence and inserts a preamble segment comprised of a sequence of steady pulse signals in the data portion at a predetermined time interval, and transmits it as a radio wave, and another communication apparatus receives a pulse sequence as a radio wave transmitted from the one of the communication apparatuses, and detects at least the preamble segment from the frame contained in the received pulse sequence through a detection window structured to have a predetermined time length, whereby a transmission timing for the pulse signal to the communication apparatuses is controlled according to a state of detection of the preamble segment.

To overcome the problem, a bidirectional wireless communication method for carrying out bidirectional wireless communication among communication apparatuses based on a UWB communication system according to the present invention is characterized in that one of the communication apparatuses sequentially generates a pulse sequence having pulse signals arranged based on the UWB communication system, performs a framing process to form a frame having at least a preamble and a data portion on the generated pulse sequence and inserts a preamble segment comprised of a sequence of steady pulse signals in the data portion at a predetermined time interval, and transmits it as a radio wave, and another communication apparatus receives a pulse sequence as a radio wave transmitted from the one of the communication apparatuses, and detects at least the preamble segment from the frame contained in the received pulse sequence through a detection window structured to have a predetermined time length, whereby a transmission timing for the pulse signal to the communication apparatuses is controlled according to a state of detection of the preamble segment.

Effect of the Invention

At the time of carrying out bidirectional wireless communication based on the UWB communication system, it is possible to discriminate that frame data is currently being transmitted from a counterpart. This makes it possible to detect if a counterpart communication apparatus which attempts to transmit data is communicating with other communication apparatuses in the same channel or same piconet (in case of using the same codes), and thus prevent a plurality of different communication apparatuses from performing data communications to one communication apparatus at the same time in the same channel or same piconet.

BRIEF DESCRIPTION OF DRAWINGS

FIG. 10 is a block structural diagram of a communication apparatus which can receive a coherent signal and a non-coherent signal.

Figure 1:
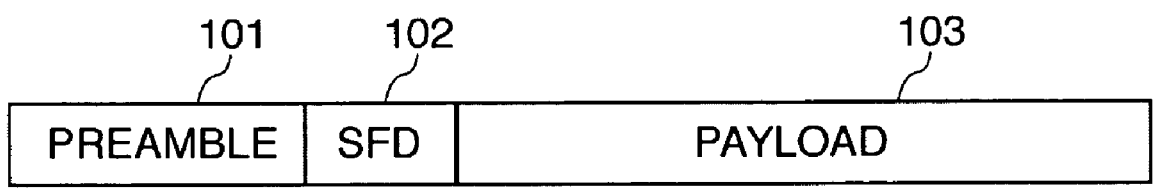
FIG. 1 is a diagram showing an example of the format structure of packet data to be used in ordinary UWB-based wireless communication.
Figure 2:
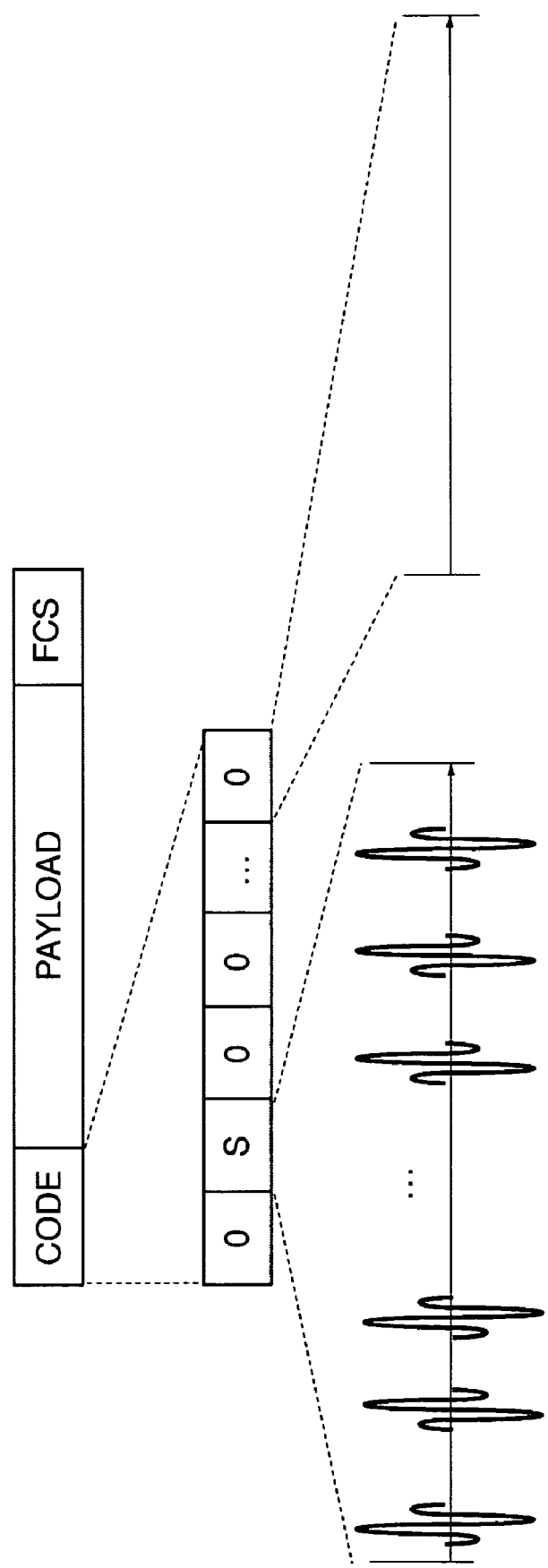
FIG. 2 is a diagram for explaining the details of a payload.

DESCRIPTION OF REFERENCE NUMERALS 1 bidirectional wireless communication system
2 communication apparatus
21 pulse generator
22 pulse shaper
23 local oscillator
24 mixer circuit
25 filter
26 first amplifier
27 antenna
32 filter
33 LNA
41 LPF
43 second amplifier
45 ADC
47 signal detector
51 switch circuit
52 mixer circuit

BEST MODE FOR CARRYING OUT THE INVENTION

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

A bidirectional wireless communication system which carries out bidirectional wireless communication based on a UWB (Ultra Wide Band) communication system will be described in detail as the best mode for carrying out the present invention with reference to the accompanying drawings.

Figure 3:
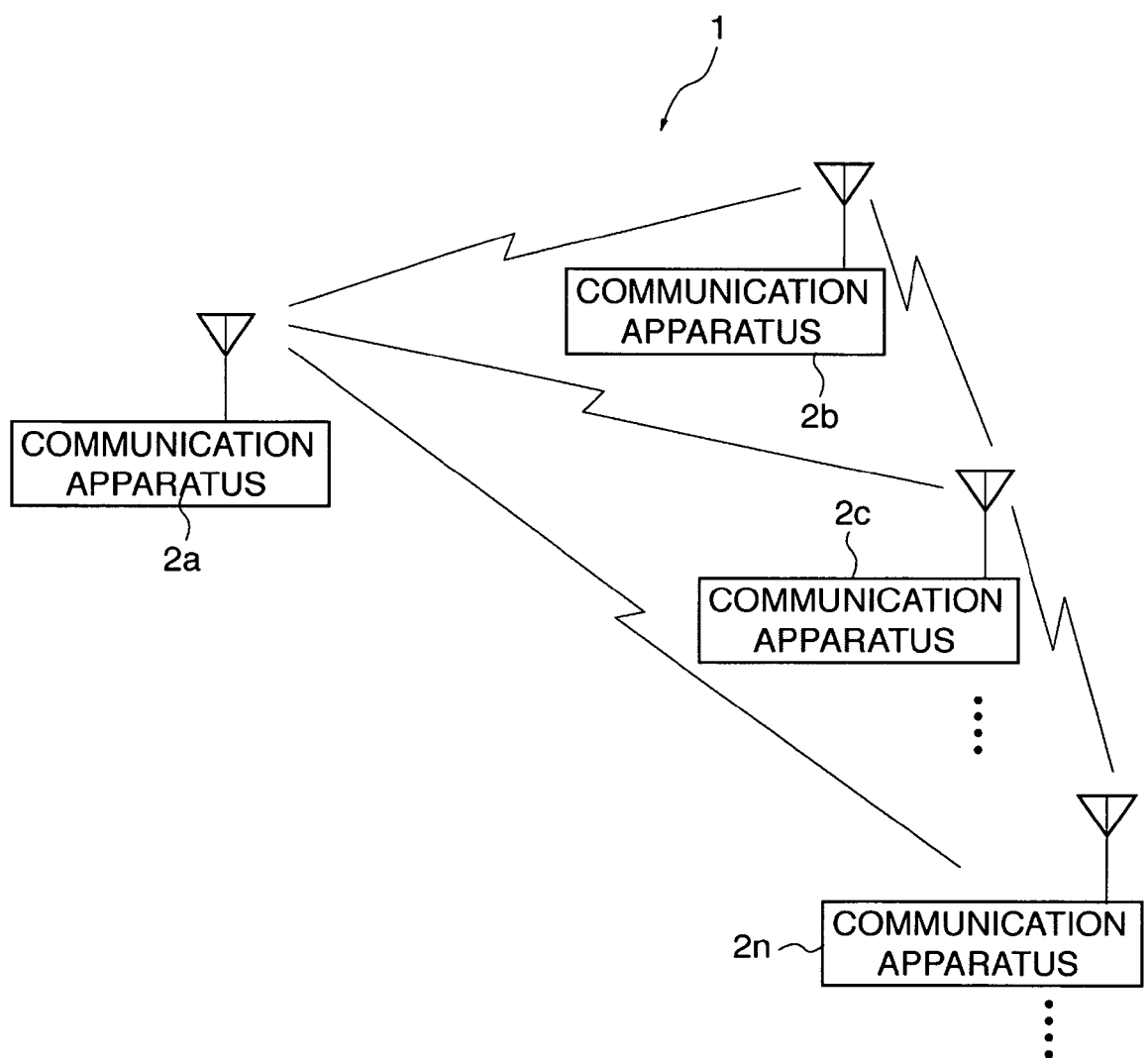
FIG. 3 is a diagram showing the system structure of a bidirectional wireless communication system to which the present invention is applied.

FIG. 3 shows the system structure of a bidirectional wireless communication system to which the present invention is applied. The bidirectional wireless communication system 1 carries out bidirectional wireless communication as one communication apparatus 2a by transmitting and receiving radio waves to and from other communication apparatuses 2b, 2c, ..., 2n based on the UWB communication system. The wireless communication system 1 is a system which transmits and receives data in the same channel or the same piconet using the same codes.

The communication apparatuses 2 are wireless communication apparatuses capable of transmitting and receiving radio waves to and from one another using the UWB communication technique. In the UWB communication, pulse signals having a very narrow time width of 1 nanosecond are used and the positions and phases of the pulse signals on the time axis are changed to transfer information without using a carrier wave. While the use of pulse signals having a very narrow time width of 1 nanosecond or less significantly widens the signal band where signals for UWB communication occupy to several GHz, the modulation process itself becomes unnecessary, so that the spectral power density can be reduced. Because the spectral power density can be suppressed to or below the signal level of noise, the apparatus is not susceptible to the influences of other communication systems or various kinds of devices, thus achieving a high data transfer characteristic.

Since the UWB communication, unlike a communication system using a carrier wave to transmit radio waves, can achieve communication merely by sending very short pulses, it is possible to make the consumed power very low, and achieve very fast communication by shortening the transmission intervals of pulse signals.

Figure 4:
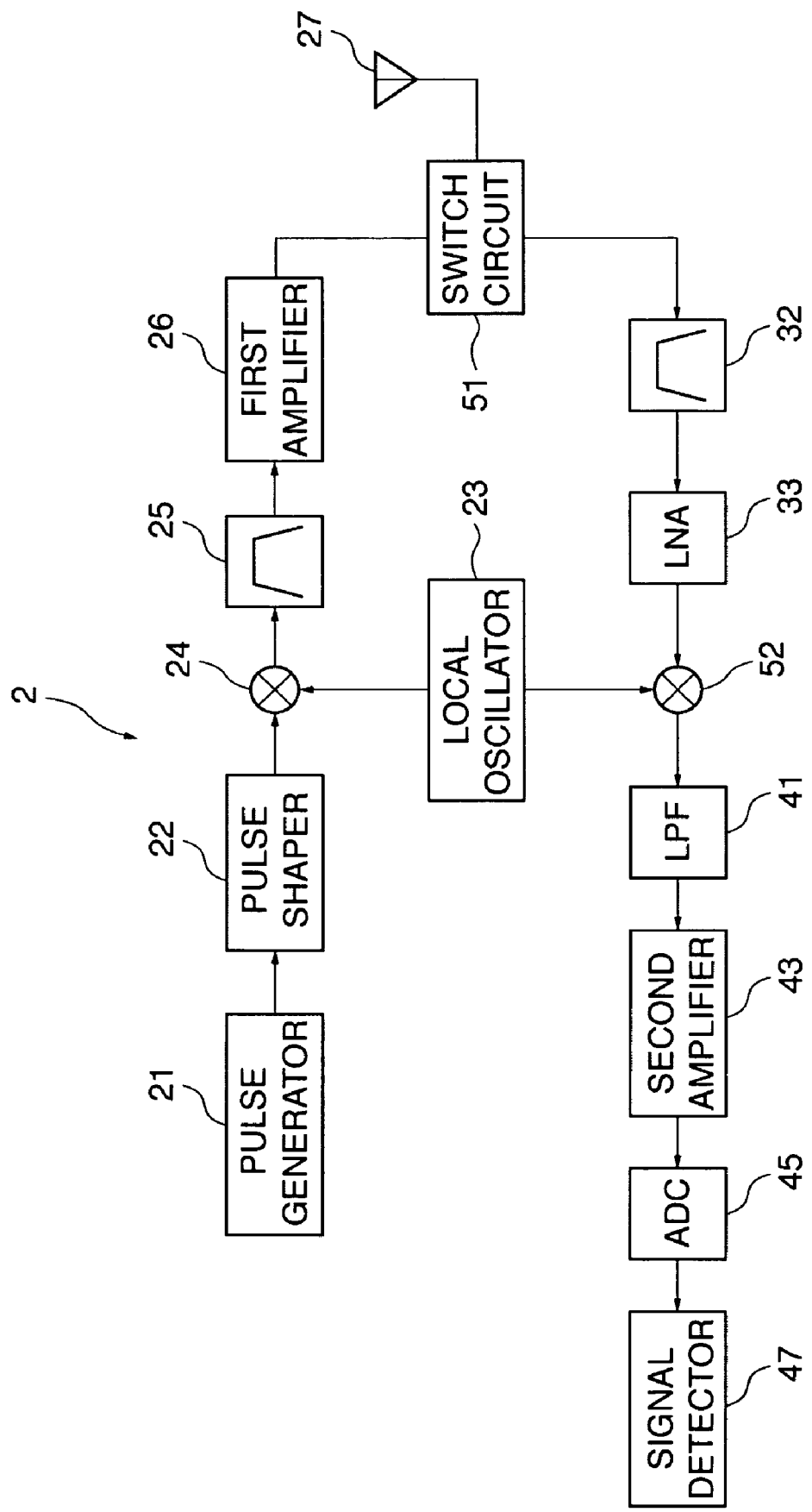
FIG. 4 is a block structural diagram of a communication apparatus to be used in the bidirectional wireless communication system to which the present invention is applied.

FIG. 4 shows the block structure of the communication apparatus 2 which generates pulse signals needed in such UWB communication and detects pulse signals transmitted from a counterpart.

The communication apparatus 2 includes a pulse generator 21 which generates pulse signals, a pulse shaper which is connected to the pulse generator 21 and receives the pulse signals generated by the pulse generator 21, a mixer circuit 24 which performs frequency conversion of pulse signals output from the pulse shaper 22 based on a reference signal to be described later, a local oscillator 23 for generating the reference signal, a filter 25 for limiting the pass band of the signals frequency-converted by the mixer circuit 24, a first amplifier 26 connected to the filter 25, a switch circuit 51 connected to the first amplifier 26, and an antenna 27 connected to the switch circuit 51. The communication apparatus 2 includes a filter 32 connected to the switch circuit 51, a low noise amplifier (LNA) 33 which performs high-frequency signal processing on a pulse sequence output from the filter 32, a mixer circuit 52 connected to the LNA 33 and the local oscillator 23, and an LPF 41, a second amplifier 43 and an ADC 45 connected in this order to the mixer circuit 52, with a signal detector 47 connected to the ADC 45.

The switch circuit 51 executes a switching process to connect the first amplifier 26 to the antenna 27 at the time of transmitting a pulse sequence to other communication apparatuses 2. The switch circuit 51 also executes a switching process to connect the antenna 27 to the filter 32 at the time of receiving pulse sequences from other communication apparatuses 2.

The pulse generator 21 generates pulse signals having a narrow time width over a wide band of several GHz based on the UWB system. In actually generating the pulse signals, the pulse generator 21 sequentially generates a pulse sequence having pulse signals with equal amplitudes arranged at equal time intervals. The pulse sequence generated by the pulse generator 21 is transmitted directly to the pulse shaper 22.

The pulse shaper 22 performs a predetermined shaping process on each of the pulse signals constituting a diffusion type pulse sequence transmitted from the pulse generator 21.

The local oscillator 23 generates a reference signal for modulation. The local oscillation frequency of the reference signal generated by the local oscillator 23 may be structured to be variable in the local oscillator 23. The local oscillator 23 may be controlled in such a way that the local oscillation frequency to be generated is enhanced or attenuated based on a PLL circuit, not shown, or the like.

The mixer circuit 24 performs frequency conversion of each pulse signal constituting the pulse sequence undergone the shaping process by the pulse shaper 22 based on the reference signal transmitted from the local oscillator 23. The mixer circuit 24 sends a pulse sequence of the frequency-converted pulse signals to the filter 25.

The filter 25 passes only the desired band of the UWB-based pulse sequence output from the mixer circuit 24, and cuts unnecessary bands. The pass band of the filter 25 may be set in such a way as to be able to remove unnecessary frequency components generated at the time of frequency conversion by the mixer circuit 24. A pulse sequence having band components which have passed the filter 25 is directly output to the first amplifier 26.

The first amplifier 26 amplifies the pulse sequence output from the filter 25, and corrects it so that the frequency characteristic becomes flat in the band.

The antenna 27 converts a pulse sequence having pulse signals as electric signals amplified by the first amplifier 26 into a pulse sequence as electromagnetic radio waves, and radiates the pulse sequence in the air. The communication apparatus 2 may be installed with a function of counting the time at the time of radiating the pulse sequence as radio waves from the antenna 27. The antenna 27 receives the pulse sequence as radio waves transmitted from the counterpart, and converts the pulse sequence into a pulse sequence of electric pulse signals.

The filter 32 removes signals out of the UWB band from the pulse sequence received by the antenna 27. That is, because signals out of the UWB band may be superimposed in the process of transmitting radio waves from a transmitting apparatus 2 to a receiving apparatus 3, such signals are accurately removed by the filter 32.

The LNA 33 performs low noise amplification on a pulse sequence received by the antenna 27 and transmitted via the filter 32. UWB-based pulse signals are weak signals with levels equal to or lower than the signal level of noise, so that even if the signals are amplified by an ordinary amplifier, it is not possible to distinguish noise from UWB signals. In this respect, with the LNA 33 installed, a pulse sequence free of a noise influence can be acquired by selectively amplifying only desired UWB-based pulse signals. The pulse sequence subjected to low noise amplification by the LNA 33 is supplied to the mixer circuit 52 connected thereto.

The local oscillator 23 generates an in-phase signal (I signal) and an orthogonal signal (Q signal) as base band reference signals. The local oscillator 23 outputs the generated I signal and Q signal to the mixer circuit 52.

The mixer circuit 52 performs orthogonal modulation on each of the pulse signals constituting the pulse sequence transmitted from the LNA 33, based on the I signal and Q signal output from the local oscillator 23.

The LPF 41 removes a high-frequency component in the UWB-based pulse sequence modulated by the mixer circuit 52, and passes only a low-frequency component thereof.

The second amplifier 43 amplifies the pulse sequence band-limited by the LPF 41, and sends the amplified pulse sequence to the ADC 45.

The ADC 45 samples pulse signals of the analog base band transmitted from the second amplifier 43 to provide digital signals, and transmits the digital pulse sequence to the signal detector 47.

The signal detector 47 detects pulse signals constituting the pulse sequence transmitted from the ADC 45. A detailed method for the signal detection will be described later.

Next, referring to the diagrams, a detailed description will be given of a method of actually transmitting and receiving radio signals in the bidirectional wireless communication system 1 to which the present invention is applied.

First, the pulse generator 21 generates a pulse sequence of UWB-based pulse signals over a wide band. The generated pulse sequence is subjected to a shaping process in the pulse shaper 22. The pulse sequence is also modulated by the mixer circuit 24 with a high-frequency component based on the local oscillation frequency.

Figure 5:
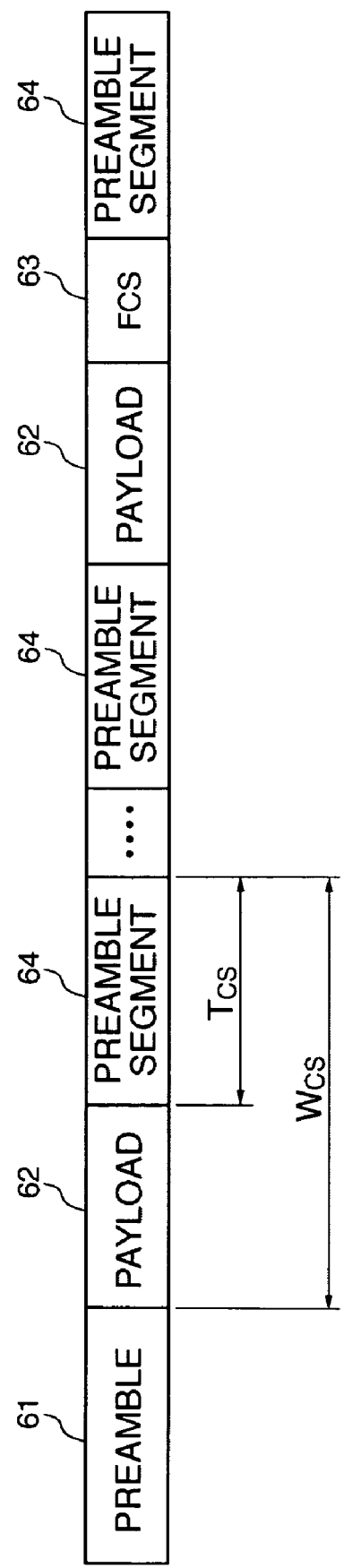
FIG. 5 is a diagram showing the details of frame data to be transmitted and received in the bidirectional wireless communication system to which the present invention is applied.

At this time, the pulse sequence is structured as frame data as shown in FIG. 5, for example. The example of the format structure relates to a frame based on the standards of, for example, IEEE 802.11, IEEE 802.15.4 or the like. As shown in FIG. 5, frame data has a payload portion 62 added to a preamble 61 for indicating the presence of the frame data, and an FCS (Frame Check Sequence) 63 added to the end of the payload portion 62. Further, a preamble segment 64 having a sequence of steady pulse signals is inserted into the payload portion 62. A header area, not shown, where management information or the like is written may be provided between the preamble 61 and the payload portion 62. A gap of, for example, 12 bytes may be provided between frames.

Figure 6:
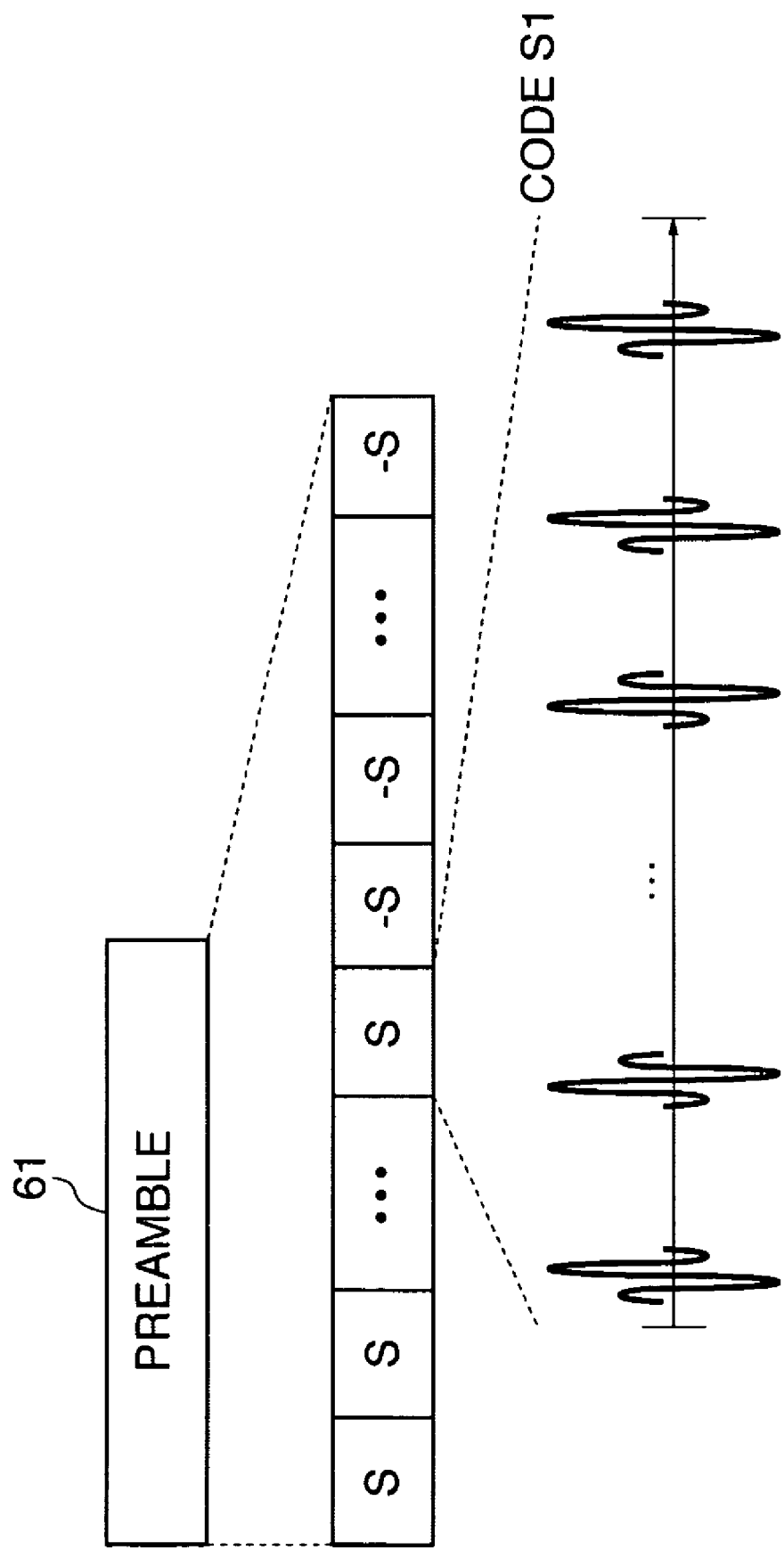
FIG. 6 is a diagram for explaining a structural example of a preamble.

The preamble 61 is generated in a physical layer, and dummy information to prevent reception failure of frame data is written in the preamble 61. In the UWB-based communication, the preamble 61 is expressed by arranging a plurality of regular codes of pulse signals having a very narrow time width, and arranging an inverted sequence of the plurality of pulse signals as the regular codes. In case of expressing the preamble 61, as shown in FIG. 6, for example, a sequence (indicated by "S" in the diagram) of regular codes of pulse signals having a very narrow time width are arranged and a plurality of inverted code sequences (indicated by "-S" in the diagram) of the regular pulse signals are arranged. The code sequence to be used in the preamble 61 is called code S1.

The transmitted signal is acquired and its preamble 61 is evaluated, and when it is discriminated that a correct signal has been transmitted, communication is initiated in synchronism with the signal.

Because the preamble 61 has the pulse signals arranged regularly according to predetermined codes as mentioned above, a communication apparatus which has received the frame data added with the preamble 61 can capture signals, execute synchronization and channel prediction, and thus execute communication by detecting the regular sequence of pulse signals and codes thereof in the preamble 61. Other communication apparatuses excluding the counterpart communication apparatus which is currently in communication can easily determine whether the channel is occupied currently by acquiring information written in the preamble 61.

Figure 7:
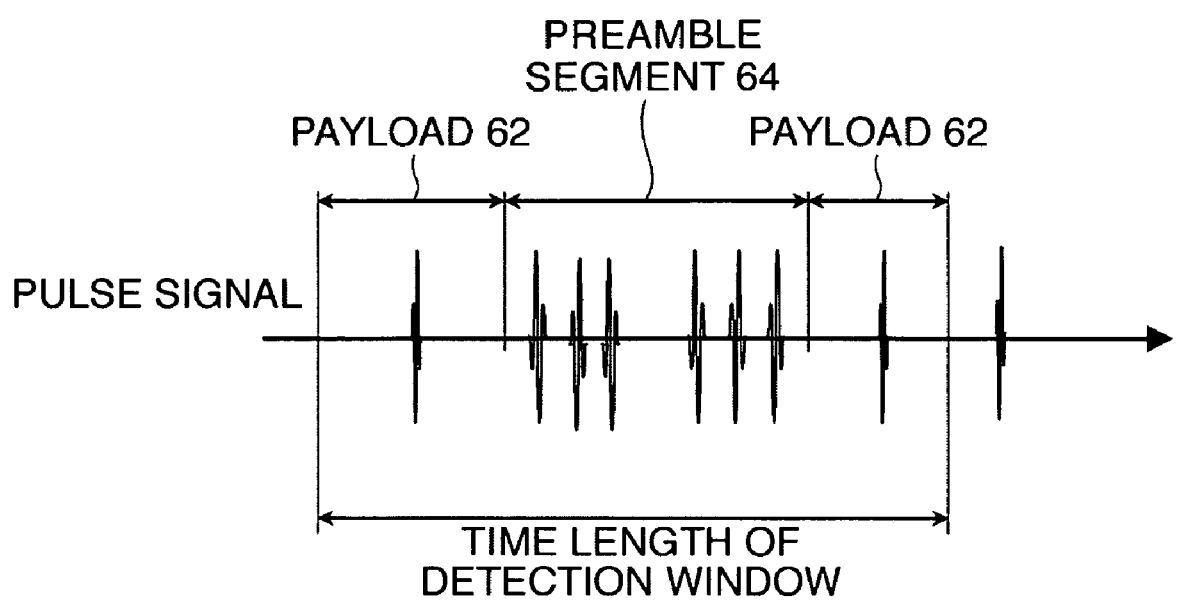
FIG. 7 is a diagram for explaining an example wherein a preamble segment inserted in a payload portion is taken into a detection window and analyzed.

A preamble segment 64 as shown in FIG. 7, for example, is inserted in the payload portion 62 at a predetermined time interval. The preamble segment 64 is structured as a sequence of regular pulse signals set in the preamble 61, such as the code S1. It is to be noted that the preamble segment 64 may be added to the end of the payload portion 62. In FIG. 7, at the stage where pulse signals up to the end of the preamble segment 64 have been read, it is possible to discriminate whether data is currently transmitted from other communication apparatus 2.

The frame data with such a structure has unnecessary frequency components removed by the filter 25, and converted to electromagnetic radio waves by the antenna 27 via the first amplifier 26 to be radiated in the air. The radio waves radiated in the air are received by the antenna 27 of the communication apparatus 2 at the communicating destination, and converted again to an electric pulse sequence. Then, the pulse sequence is subjected to low noise amplification by the LNA 33 and adjusted so that it can be distinguished from noise, and is then supplied to the mixer circuit 52.

The pulse sequence transmitted to the mixer circuit 52 is orthogonally modulated based on the I signal and Q signal, and then passes through the LPF 41 to remove the high-frequency component superimposed thereon. Finally, the pulse sequence is subjected to analog-digital conversion in the ADC 45, and is then transmitted to the signal detector 47.

The signal detector 47 detects and analyzes the pulse sequence transmitted from the ADC 45. The actual detection process in the signal detector 47 is executed by fetching the transmitted pulse sequence over a predetermined time, and performing more detailed pulse signal analysis on the pulse sequence fetched over the predetermined time. That is, the signal detector 47 performs a process similar to monitoring a pulse sequence through a detection window having a predetermined time length and detecting the pulse sequence. Pulse sequences transmitted from other communication apparatus 2 are time-sequentially input to the detection window. The signal detector 47 sequentially detects the input pulse sequences through the detection window, and analyzes the pulse sequences. For example, FIG. 7 shows an example where the preamble segment 64 inserted in the payload portion 62 is taken into the frame of the detection window and analyzed.

The preamble segment 64, like the preamble 61, is structured by a sequence of regular pulse signals typified by, for example, the code S1. Accordingly, with the code S1 acquired by the receiver communication apparatus 2 beforehand, if the preamble segment 64 in frame data transmitted at the time of communication can be captured in the frame of the detection window, it is possible to determine whether the pulse sequence constituting the captured preamble segment 64 matches with the code S1. As a result, in the case where the previously acquired codes match with the codes in the preamble segment 64 captured in the detection window, it is possible to discriminate that frame data is being transmitted from the counterpart at present.

Note that the preamble segment 64 is inserted in the payload portion 62 constituting real data at a predetermined time interval. Even when the payload portion 62 is captured in the detection window in the signal detector 47, therefore, the preamble segment 64 is inserted in the payload portion 62 whenever needed, so that the codes of the pulse sequence can be identified by capturing the preamble segment 64 in the detection window. It is also possible to synchronize communications through the regular pulse sequence in the preamble segment 64.

According to the related art, the regular pulse sequence is written only in the preamble 61, so that when the preamble 61 has already passed through the frame of the detection window, feeding only the payload portion 62 following into the detection window drags on. In this case, the state where pulse signals constituting real data and empty areas are irregularly arranged is just detected through the detection window, and in the empty areas, particularly, noise or other pulse signals as a piconet are merely arranged irregularly. Therefore, regular information cannot be acquired by simple detection of the payload portion 62 through the detection window, whereas in the present invention which has the preamble segment 64 inserted in time areas in the payload portion 62, the preamble segment 64 is input into the detection window at a high frequency and the codes of the pulse sequence can be identified at a high frequency.

The present invention makes it possible to discriminate that frame data is being transmitted from other communication apparatuses 2 as well as to discriminate that frame data is being transmitted from any counterpart communication apparatus 2. For example, provided that the codes of the pulse sequence constituting the preamble segment 64 are set separately for different communication apparatuses 2, if the codes of the pulse sequence can be read through the detection window, the communication apparatus 2 in which the codes are set can easily be specified, and it is possible to specify which communication apparatus 2 has transmitted the sent frame data and specify the channel.

That is, according to the present invention, one communication apparatus 2 sequentially generates a pulse sequence having pulse signals arranged based on the UWB communication system, performs a framing process to form a frame having a preamble 61 and a payload portion 62 on the generated pulse sequence and inserts a preamble segment 64 comprised of a sequence of steady pulse signals in the payload portion 62 at a predetermined time interval, and transmits it as a radio wave, and the another communication apparatus 2 receives a pulse sequence as a radio wave transmitted from the one communication apparatus 2, and detects at least the preamble segment 64 from the frame containing the received pulse sequence through the detection window structured to have a predetermined time length.

Consequently, it is possible to detect if one communication apparatus 2 is communicating with other communication apparatuses 2 in the same channel or same piconet (in case of using the same code), and prevent a plurality of different communication apparatuses 2 from performing data communications to one communication apparatus 2 at the same time in the same channel or same piconet.

According to the present invention, in a case where the another communication apparatus 2 which has detected the pulse sequence transmitted from one communication apparatus 2 through the detection window transmits frame data generated itself to a further communication apparatus 2 or the one communication apparatus 2 in the same channel or same piconet, it is possible to discriminate whether data is currently being transmitted from the one communication apparatus 2. Consequently, when it is discriminated that data is currently being transmitted from the one communication apparatus 2, the another communication apparatus 2 delays transmission of the data generated itself to the counterpart until the transmission of the data is completed. As a result, it is possible to prevent a plurality of different communication apparatuses 2 from simultaneously transmitting data to one communication apparatus 2.

According to the present invention, the time length of the detection window may be adjusted according to the time length of the preamble segment 64 beforehand. To review the time length of the preamble segment and the time length of the detection window, the results of examining the processing performance (throughput) per unit time and consumed power under individual conditions will be described below.

Figure 8:
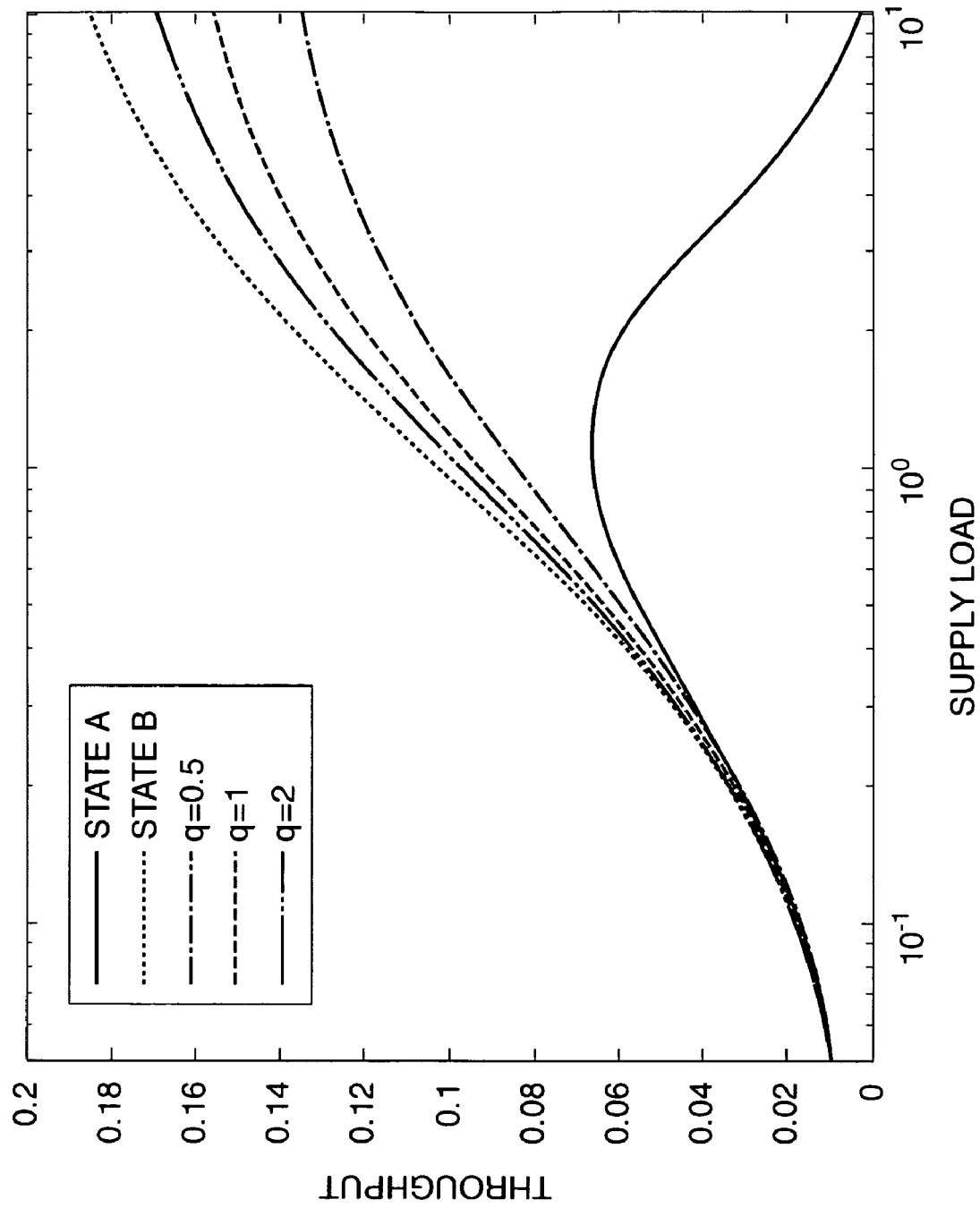
FIG. 8 is a diagram showing the results of measuring the throughput with respect to the supply load.
Figure 9:
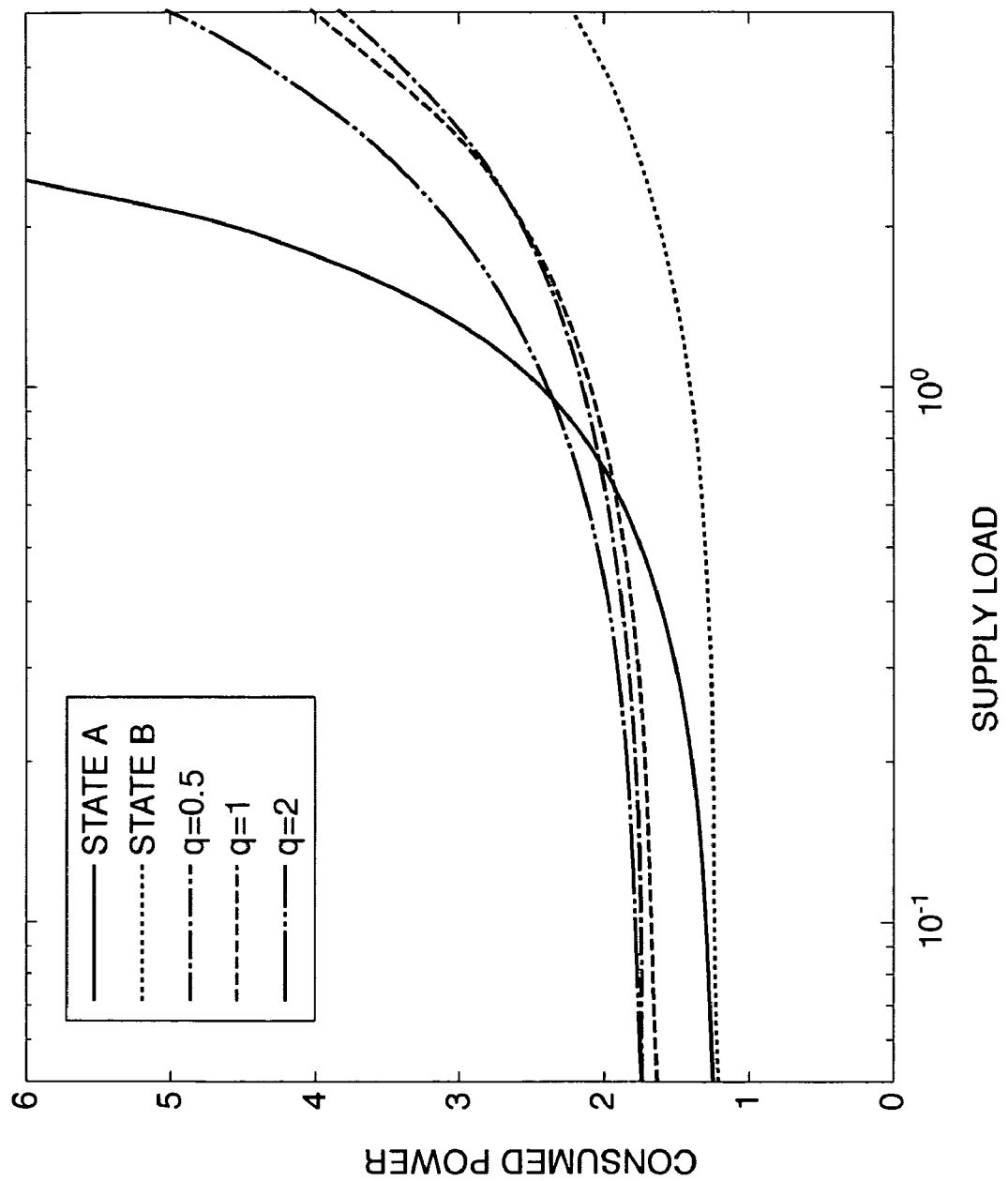
FIG. 9 is a diagram showing the results of measuring the consumed power with respect to the supply load.

In the examination, as shown in FIG. 5, the time length of the detection window is expressed by $W_{cs}$ and that of the preamble segment 64 is expressed by $T_{cs}$. When $W_{cs}=q \times T_{cs}$, the throughput and consumed power were measured for each of data in which the detection window time length $W_{cs}$ was set so as to provide the relations of q=0.5, 1 or 2, data of a state A where, as in the related art, only the preamble 61 constituted the payload portion 62 in which no preamble segment 64 was inserted, and data of an ideal state B where frame data was entirely formed by the preamble segments 64. The results of measuring the throughput are shown in FIG. 8, and the results of measuring the consumed power are shown in FIG. 9. Note that the consumed power in FIG. 9 indicates consumed power on the premise that communication has succeeded.

As shown in FIG. 8, as the supply load increases, the throughput increases most in the ideal state B where frame data is entirely formed by the preamble segments 64, and rises in the order of q=2, q=1 and q=0.5. In the state A, the throughput showed the lowest.

In the state B, because a largest number of preamble segments 64 are provided, those preamble segments 64 can be detected in the detection window at a very high frequency, so that the throughput can be improved considerably.

In the case of q=2, as the detection window time length $W_{cs}$ is set twice the time length $T_{cs}$ of the preamble segment 64, all the preamble segments 64 can be captured in the frame of the detection window, and the preamble segments 64 can be detected at a high frequency. In the case of q=1, as the detection window time length $W_{cs}$ is set equal to the time length $T_{cs}$ of the preamble segment 64, the detection performance of the preamble segment 64 is reduced as compared with the case of q=2. In the case of q=0.5, the detection performance of the preamble segment 64 becomes lower.

If the detection performance of the preamble segment 64 is increased, it is possible to improve the ability of discriminating whether frame data is transmitted from a counterpart at present, and improve the channel identifying performance. As a result, the throughput per unit time can be improved.

As shown in FIG. 9, as the supply load increases, the consumed power generally rises; however, in the case of the state A, for example, the increase rate of the consumed power is considerably high, and gradually decreases for q=2, q=1 and q=0.5, and in the case of the state B, the increase rate of the consumed power becomes the minimum. With q=2, while the sensing probability increases, extra power is added according to the preamble segment 64, resulting in higher consumed power. For a similar reason, the consumed power gradually becomes lower in the order of q=1 and q=0.5.

It is apparent from the examination results that when q=2, i.e., when the detection window time length $W_{cs}$ is set twice the time length $T_{cs}$ of the preamble segment 64, best effects are provided for both the throughput and consumed power. It is therefore desirable that q be equal to or greater than 2.

The present invention is not limited to the above-described embodiment. For example, the transmission and reception of data may be executed by a communication apparatus 8 which can receive both a coherent signal and a non-coherent signal as shown in FIG. 10. FIG. 10 shows an example of specific circuit configuration of the communication apparatus 8.

The communication apparatus 8 has an antenna 81 which receives transmitted radio waves, and a BPF (Band pass filter) 82, connected to the antenna, for removing noise other than the frequency component of the transmitted pulse sequence as radio waves.

The BPF 82 is connected with a coherent signal receiving section 83 for receiving a coherent signal, and a non-coherent signal receiving section 84 for receiving a non-coherent signal. The coherent signal receiving section 83 and non-coherent signal receiving section 84 are further connected to a signal processing section 85.

The coherent signal receiving section 83 has a filter 91, an inverse diffusion circuit 92, a square circuit 93 and an integrating circuit 94. A coherent signal which has passed the filter 91 is collated with a coherent signal in the inverse diffusion circuit 92 with the waveform of the code S1 being a template, so that inverse diffusion is performed on pulse-diffused received signals. The received signals subjected to the inverse diffusion are sent to the signal processing section 85 through the square circuit 93 and the integrating circuit 94. It is to be noted that the integrating circuit 94 performs an integral according to the size of the detection window.

The non-coherent signal receiving section 84 has a square circuit 95, an integrating circuit 96 and an inverse diffusion circuit 97. A non-coherent signal which has passed the square circuit 95 and the integrating circuit 96 is subjected to inverse diffusion based on the waveform of the code S1, and is then sent to the signal processing section 85.

The signal processing section 85 has an ADC (Analog Digital Converter) 98, an averaging circuit 99 and a signal detector 100.

The ADC 98 performs analog-digital conversion on signals transmitted from the coherent signal receiving section 83 and non-coherent signal receiving section 84, and sends the signals to the averaging circuit 99. The averaging circuit 99 performs an averaging process on the signals undergone the digital conversion, and sends the signals to the signal detector 100. Based on the signals subjected to the averaging process, the signal detector 100 detects the preamble segment 64 as in the above-described case.

The above-described functional advantages can of course be obtained by using this communication apparatus 8.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

The invention claimed is:

1. A bidirectional wireless communication apparatus for carrying out bidirectional wireless communication based on a UWB (Ultra Wide Band) communication system, comprising:
   a pulse sequence generator that sequentially generates a pulse sequence having pulse signals arranged based on the UWB communication system;
   a framing element that performs a framing process to form a frame having at least a preamble and a data portion on the pulse sequence generated from the pulse sequence generating means and inserts a preamble segment including a sequence of steady pulse signals in the data portion at a predetermined time interval;
   a transmitter that transmits a pulse sequence containing the frame generated by the framing element as a radio wave;
   a receiver that receives a pulse sequence as a radio wave transmitted from another bidirectional wireless communication apparatus; and
   a detector that detects at least the preamble segment from the frame contained in the pulse sequence received by the receiver through a detection window having a time length that is equal to or greater than two times a time length of the preamble segment;
   said transmission timing of the transmitter for the pulse sequence being controlled according to a state of detection of the preamble segment by the detector.

2. A bidirectional wireless communication system for carrying out bidirectional wireless communication among a plurality of communication apparatuses based on a UWB communication system, said system comprising:
   a first communication apparatus configured to sequentially generate a pulse sequence having pulse signals arranged based on the UWB communication system, perform a framing process to form a frame having a preamble and a data portion on the generated pulse sequence, insert a preamble segment including a sequence of steady pulse signals in the data portion at a predetermined time interval, and transmit said pulse sequence as a radio wave;
   a second communication apparatus configured to receive a pulse sequence as a radio wave transmitted from the first communication apparatus, and detect at least the preamble segment from the frame contained in the received pulse sequence through a detection window having a time length that is equal to or greater than two times a time length of the preamble segment;
   transmission timing for the pulse signals to the communication apparatuses being controlled according to a state of detection of the preamble segment.

3. A bidirectional wireless communication method for carrying out bidirectional wireless communication among a plurality of communication apparatuses based on a UWB communication system, said method comprising the steps of:
   a first communication apparatus sequentially generating a pulse sequence having pulse signals arranged based on the UWB communication system, performing a framing process to form a frame having at least a preamble and a data portion on the generated pulse sequence and inserting a preamble segment including a sequence of steady pulse signals in the data portion at a predetermined time interval;

transmitting, by said first communication apparatus, said pulse sequence as a radio wave;

a second communication apparatus receiving a pulse sequence as a radio wave transmitted from the first communication apparatus, and detecting at least the preamble segment from the frame contained in the received pulse sequence through a detection window having a time length that is equal to or greater than two times a time length of the preamble segment; and controlling a transmission timing for the pulse sequence to the communication apparatuses according to a state of detection of the preamble segment.

* * * * *